Figure 4:
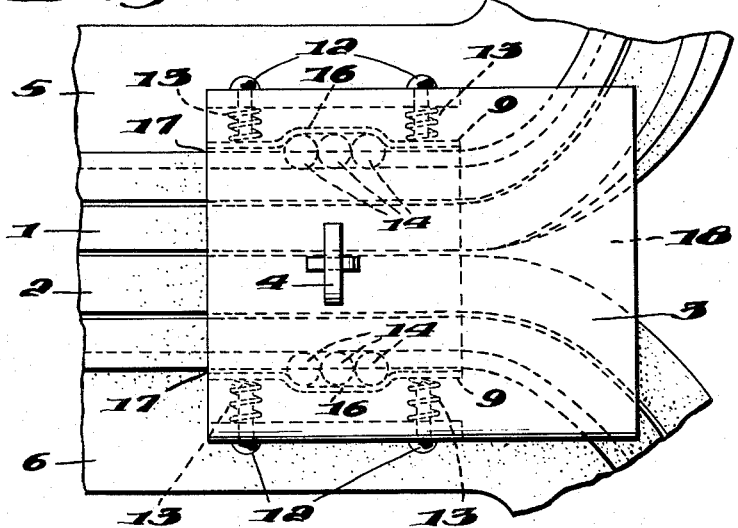

Aug. 29, 1961   L. MARKOFF-MOGHADAM   2,997,765
FASTENER OF SLIDER TYPE WITH INTERLOCKING PARTS
MADE OUT OF MOLDED ELASTIC MATERIALS
Filed Oct. 28, 1958                                3 Sheets-Sheet 1
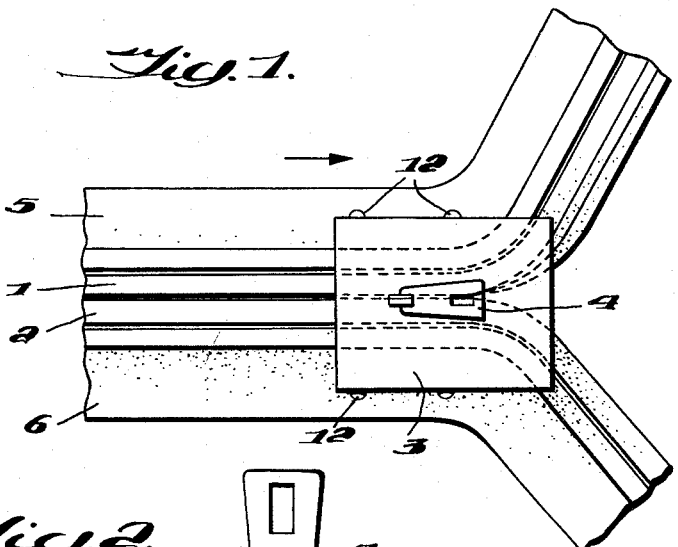
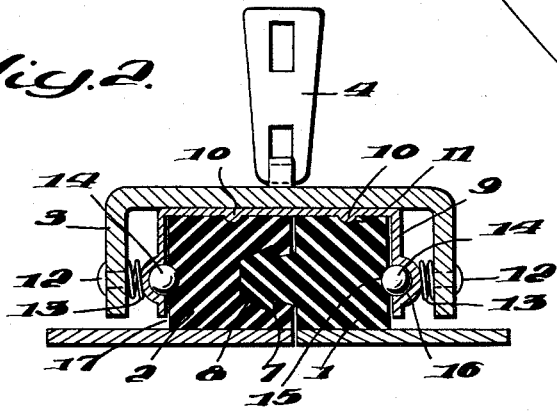
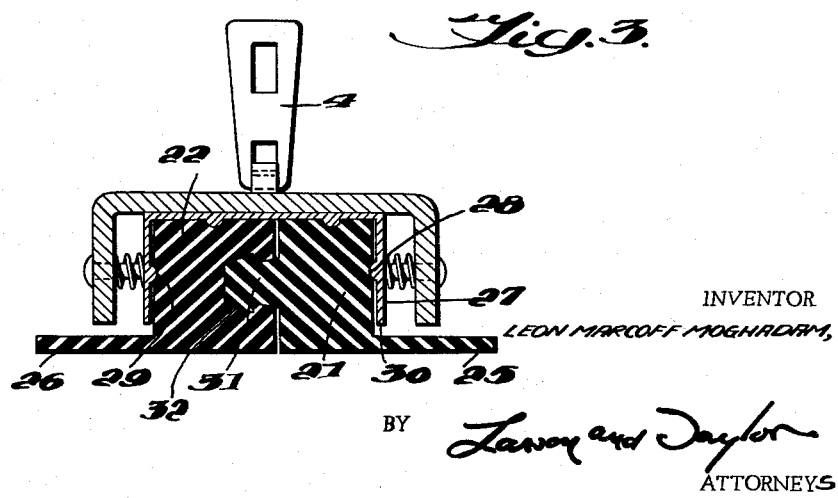
INVENTOR
LEON MARKOFF MOGHADAM,
BY
ATTORNEYS Aug. 29, 1961  L. MARKOFF-MOGHADAM  2,997,765
FASTENER OF SLIDER TYPE WITH INTERLOCKING PARTS
MADE OUT OF MOLDED ELASTIC MATERIALS
Filed Oct. 28, 1958  3 Sheets-Sheet 2

INVENTOR
LEON MARCOFF
MOGHADAM,
BY Lawson and Taylor
ATTORNEYS

Aug. 29, 1961 L. MARKOFF-MOGHADAM 2,997,765
FASTENER OF SLIDER TYPE WITH INTERLOCKING PARTS
MADE OUT OF MOLDED ELASTIC MATERIALS
Filed Oct. 28, 1958 3 Sheets-Sheet 3

INVENTOR
LEO MARKOFF MOGHADAM,
BY Lawry and Taylor
ATTORNEYS

United States Patent Office 2,997,765
Patented Aug. 29, 1961

2,997,765
FASTENER OF SLIDER TYPE WITH INTERLOCKING PARTS MADE OUT OF MOLDED ELASTIC MATERIALS
Leo Markoff-Moghadam, 2938 Newark St. NW., Washington, D.C.
Filed Oct. 28, 1958, Ser. No. 770,061
1 Claim. (Cl. 24—201)

This invention relates to fastening devices of the type employed to fasten the separate parts of articles of fabric, leather, or the like, the opposed edges to be coupled being provided with interlocking fasteners, and a slider being provided to couple and uncouple these.

Slide fasteners in accordance with the present invention are made out of molded elastic materials, such as natural rubber, synthetic rubber or various kinds, plastics, and the like. Slide fasteners of this general type have heretofore been known. They have been comprised of continuous stringer elements secured to the edges of the material to be joined, the elements having complementary shaped surfaces adapted to engage each other and to lock one within the other. The locking is effected by a slider member which is moved along the fastener to force the stringer elements together into locking position or to force them apart when it is desired to unlock them.

A well functioning and flexible fastener of this type made out of molded elastic materials, apart from its cheapness, can have definite technological advantages even over so largely used slide fasteners as those generally referred to as "zippers." With the so-called "zipper" fastener the clothing often becomes entangled with the engaging elements, thereby rendering it most difficult to operate the slider member. Furthermore, when the stringer elements become improperly engaged, it is exceedingly difficult to restart the slider member.

These complications appear to be overcome by fasteners made out of molded elastic materials of the general type to which this invention relates. Moreover, in connection with winter clothing, so important in cold and arctic regions, the ordinary "zipper" fastener is subject to the disadvantage that the stringer elements frequently become frozen and the garment must be thawed out before it is possible to release the fastener.

On the other hand, freezing temperatures will not affect a fastener made out of nitrile type synthetic rubber, which, apart from its high resistance to the deterioration and swelling effects of greases, oils and waxes and solvents, can be compounded to be flexible at temperatures below —70° F. and to resist the deteriorating effects of high temperature ranging up to 300° F.

However, up until the present time fastening devices made out of rubber or plastic have not become popular, in spite of the fact that several types of such fasteners have been the subject of patents dating back as much as twenty-five or thirty years ago.

It is believed that the lack of popularity of the plastic or rubber fastener has been due to some inherent defects in the functioning of such fasteners. All of these plastic or rubber fasteners heretofore known have been based upon the idea of interlocking of two elastic stringer elements, the entire length of one of the stringers either being provided with a specially formed rib projection adapted to fit in a complementary shaped longitudinal recess in the other stringer, or flexible rubber strips have been cut along the longitudinal center line in such a manner as to form gear tooth-like projections arranged in staggered relation so as to intermesh, the projections on one side engaging in the recesses on the opposite side.

Nevertheless, as the locking and unlocking of the fastener had to be accomplished not simply by means of fingers but by pulling a slider member, this process presented two conflicting factors. Specifically, the problem was (a) to exert by means of the slider member a considerable transverse compression on the two elastic stringer elements for obtaining their efficient interlocking, and (b) to limit the compression of the slider on the rubber or plastic stringers, because otherwise, the friction would be so great as not to permit the slider member to move freely along the fastener, and the slider would dig into the rubber or plastic.

It appears that until the present invention was conceived, no special efforts have been made by others to reduce drastically the coefficient of friction of the slider member, which friction was bound to affect the efficiency of these fasteners with interlocking parts made out of rubber or molded plastic materials.

In accordance with the present invention the arrangement is such that a novel slider member is provided, not only with transverse compression means, but also with special antifriction means. Because of the presence of such means it is possible to apply a considerable compression on the interlocking members of the fastener without affecting the smooth pull of the slider member along the fastener to lock and unlock it, and without digging into the material of which the fastener is comprised, thus preserving it from rapid wear and tear.

It is a general object of the invention to provide such a fastener.

Another object of the invention resides in providing such a slider member so designed as to reduce to a minimum the friction of the slider member, and to increase to the desired maximum the compression exerted on the two elastic interlocking stringer elements.

Further, this invention has for an additional object the provision of means to increase to the maximum the compression exerted on the two elastic interlocking stringer elements, said means being easily regulated to effect the desired compression by means of interchangeable springs or the like.

Another and very important object of this invention resides in the provision of a slide fastener which effects an air tight and water tight closure. The advantages of such structure permit its use in a myriad of instances such as for garments for aviators and deep sea divers, to name but two.

Figure 5:
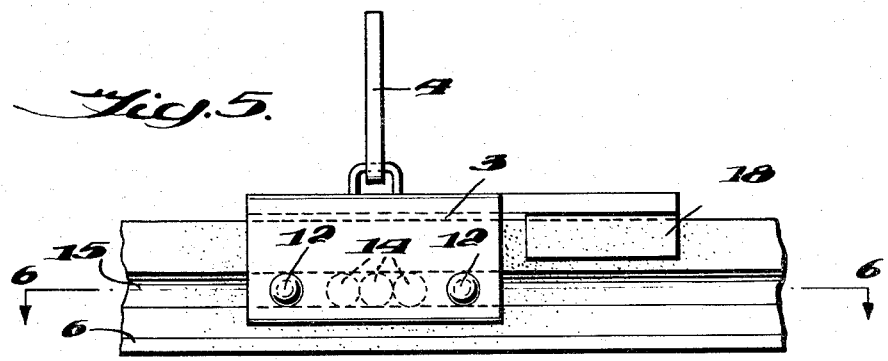
Figure 6:
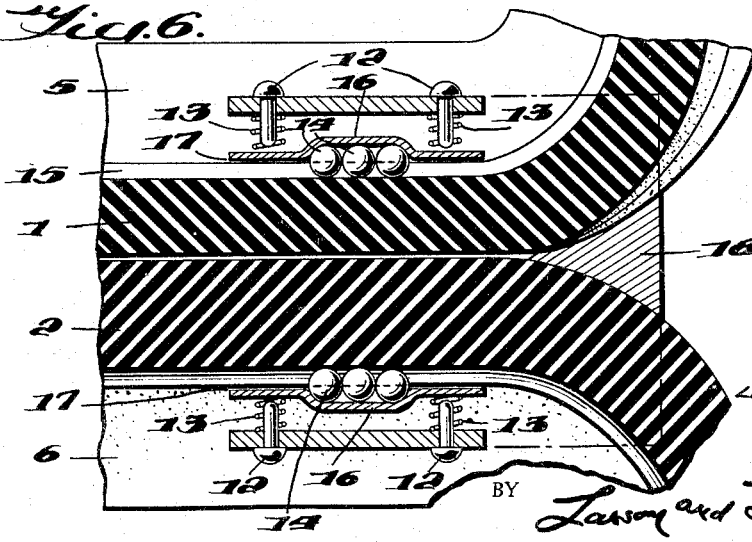
Figure 7:
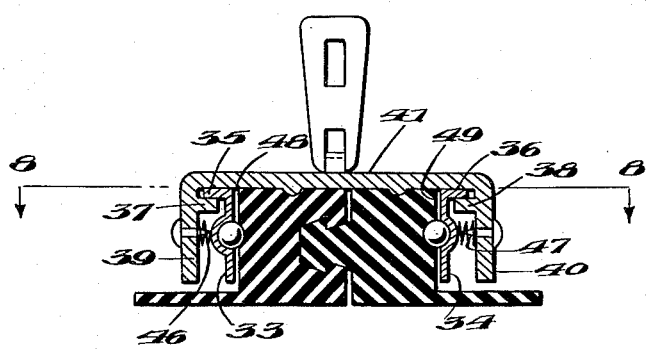
Figure 8:
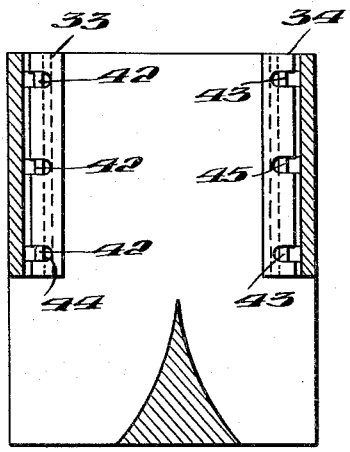
Figure 9:
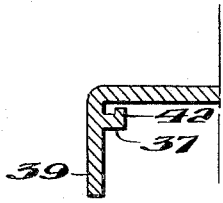

These and other objects of the invention will become more apparent from the following detailed description and claim when read in conjunction with the accompanying drawings in which:

FIG. 1 is a plan view of the fastener;
FIG. 2 is a cross sectional view of the preferred embodiment of the fastener;
FIG. 3 is a cross sectional view of an alternative embodiment of the fastener;
FIG. 4 is an enlarged plan view of the fastener in accordance with the preferred embodiment;
FIG. 5 is a side elevational view of the preferred form of the fastener;
FIG. 6 is a horizontal section taken on the line 6—6 of FIG. 5;
FIG. 7 is a cross-sectional view of another embodiment;
FIG. 8 is a sectional view taken on the line 8—8 of FIG. 7; and
FIG. 9 is a detailed sectional partial view of the slider element.

Referring now specifically to the embodiment illustrated in FIGS. 1, 2, 4, 5 and 6, which is the preferred embodiment of the invention, the fastener includes a pair of flexible stringer elements 1 and 2 which are formed so as to be capable of being joined together by means of a slider member 3 having a pull tab 4. The stringer elements may be secured directly to the edge portions of the material to be fastened by the device, or they may be secured to special strips or ribbons 5 and 6 which in turn are stitched or otherwise secured to the material to be fastened.

The stringer elements are preferably made from molded elastic materials such as natural rubber, synthetic rubber of various kinds, plastics, or the like, and should be relatively flexible. For example, it is advantageous to make the stringer elements 1 and 2 from such materials as will maintain a suitable degree of flexibility even in temperatures which are very cold or very warm for reasons heretofore mentioned. Where, for example, as heretofore mentioned, the stringer elements are made from a nitrile type synthetic rubber, it will not only possess a high resistance to the deteriorating and swelling effects of greases, oils, waxes and solvents, but the material can be compounded to remain flexible at temperatures below —70° F. and to resist the deteriorating effects of high temperatures ranging up to 300° F.

The edge of the stringer element 1 which is adapted to be coupled to stringer element 2 is provided with a longitudinal projection or protruding rib 7. In this embodiment, as seen in FIG. 2, the rib 7 is symmetrically mushroom-shaped, the head portion in cross section having the form of a truncated isosceles triangle, or symmetrical trapezoid. The stringer element 2 is provided with a longitudinal recess 8 which in cross section is complementary in shape and contour to the member 7 of the stringer 1.

The shape of the projecting rib 7 and complementary recess 8 can vary from case to case. For example, the head of the "mushroom" may be cylindrical, or a variation thereof. The optimal design depends to a great extent on specific elastic properties of the material of which the stringer elements are comprised and the compression in a transverse direction which is applied to them, as will be described.

The coupling or joining of the two stringer elements of the fastener is accomplished by progressively forcing the projecting rib 7 of stringer element 1 into the recess 8 of stringer element 2. This is effected by a transverse compression by means of the slider member 3 by pulling it by the pull tab 4 longitudinally along the stringer elements.

The slider member 3 is of special construction and is comprised of a lid element 9 preferably of metal and of C shape in section (with the open face down as shown in FIG. 2) so as to slip over the two stringer elements 1 and 2 as the slider member 3 is pulled along the fastener. The lid element 9 is preferably of flexible material. In any event, at least the two side walls or arms of this element should be resilient. The lid 9 is provided with longitudinal guide protuberances 10 which are relatively flat and are adapted to engage in longitudinal guide grooves 11 disposed in the upper surfaces of the stringer elements 1 and 2. The guide protuberances 10 ride easily in the guide grooves 11 since no compression is applied to the top of the fastener.

The lid 9 is attached to a heavy C-shaped metal or plastic part of the slider member 3 which part carries the tab pull 4 as previously mentioned. The arms of the C of this part of the slider member are provided with inwardly projecting pins 12. Springs 13 are disposed on the pins 12 and bear inwardly against the resilient arms of the C of the lid 9.

In accordance with this embodiment of the invention illustrated in FIGS. 1, 2, 4, 5 and 6, the transverse compression exerted as the slider member 3 is pulled along is exerted by the springs 13 and is transmitted to the stringer elements 1 and 2 by means of balls 14 (of plastic or light metal, preferably) which ride along in races formed by longitudinal grooves 15 on the outer side walls of the stringer elements 1 and 2, the balls being retained in position by such grooves and by the semi-cylindrical cavities 16 in the arms of the lid 9. The presence of the balls in such arrangement provides a gap or space 17 between the arms of the lid 9 and the side walls of the two stringer elements, thus drastically reducing the friction of the slider.

Thus, in coupling the fastener, the slider member 3 is pulled by the pull tab 4 in a longitudinal direction of the arrow in FIG. 1, and the stringer elements 1 and 2 will be forced together by transverse compression by the springs 13 and the lid 9. While ample force is thus provided, the longitudinal sliding movement of the slider member is eased because of the ball bearing arrangement.

For unlocking the fastener the slider member 3 is pulled by the tab 4 in the opposite direction. The slider member 3 carries a funnel-shaped wedge member 18 (see FIGS. 5 and 6). This wedge member 18 (which is of metal or plastic) has a relatively sharp edge and the wedge is thus adapted to separate the stringer elements 1 and 2 from each other as the slider member is pulled along.

In the embodiments of FIGS. 1, 2, 4, 5 and 6 the stringer elements 1 and 2 are secured to the strips 5 and 6 preferably during a vulcanization or other processing of the rubber or other material of which the stringers are constructed. The stringers can, of course, be attached later if desired, by cementing or the like.

The alternative embodiment shown in FIG. 3 differs in several respects from that just described. Here the stringers 21 and 22 are themselves provided with integral strips 25 and 26. Moreover, there are no ball bearings. Instead, the side walls of the lid 27 are here provided with protruding flat bulges 28 which slip along in the grooves 29 in the side walls of the stringer elements. The dimensions of the bulges 28 and grooves 29, however, are such as to insure the presence of a gap 30.

The embodiment of FIG. 3 also demonstrates another form of projecting rib and complementary recess on the stringer elements. Here the projection 31 on stringer 21 is also "mushroom" shaped but instead of having a cross section in the form of a truncated isosceles triangle, or symmetrical trapezoid, it is asymmetrically trapezoidal, the lower shoulder 32 being at a lesser angle. Such construction is provided for sake of easier unlocking of the fastener.

The modification illustrated in FIGS. 7, 8 and 9 instead of employing a single piece lid having side walls adapted to bear against the stringers, employs side wall strips 33, 34. These wall strips have outwardly extending flanges 35, 36, respectively, at their upper ends. These flanges 35, 36 are adapted to rest upon inwardly extending shoulders 37, 38 respectively, on the side walls 39, 40 of the slider element 41. The shoulders 37, 38 are each provided with upstanding projections 42, 43, respectively (FIGS. 8 and 9), spaced along each shoulder. The flanges 35, 36 are provided with notches 44, 45 respectively, adapted to fit over the projections 42, 43 thus permitting limited lateral movement of the wall strips 33, 34 toward and away from stringers. Similarly to the embodiment of FIGS. 1, 2, 4, 5 and 6, springs 46, 47 are provided to urge the wall strip inwardly, and ball bearings 48, 49 also are employed to facilitate movement of the slider.

It should be evident that because of the latest progress in the manufacture of synthetic rubber and plastics an appropriate material for the production of mechanically adequate stringers can be easily selected, one which, on the one hand, will stand up well against wear and tear, and on the other will possess sufficient flexibility which is indispensable for fasteners to be attached to garments.

Because of the type of material and the arrangement of the parts, it is plain to see that fastening means in accordance with the invention can be made to be both water tight and air tight, thus making the invention useful for purposes where such characteristics are necessary or desirable.

However, comparatively rigid plastic materials can be used for these fasteners which can be made flexible by cutting the rigd stringer elements into separate short links and by attaching them to strips such as the strips 5 and 6.

It will be noted that in accordance with this invention a considerable amount of transverse compression may be applied to the stringers so as to couple them, even though they be made of relatively rigid plastics. The application of this transverse compression, however, is nevertheless facilitated by means of the friction reducing arrangement which the invention provides for operation of the slider member.

While in a general manner there has been disclosed what are deemed to be practical and efficient embodiments of the invention, it should be well understood that the invention is not to be limited thereto as there might be changes made in the arrangement, disposition, and form of the parts without departing from the principle of the invention as comprehended within the scope of the accompanying claim.

I claim:

A fastening device comprising separate stringer elements with relatively long adjacent edges adapted to be coupled and uncoupled, each of said stringer elements being comprised of resilient material, said edges being flexible longitudinally because of the inherent resiliency of said material and having mating interlocking portions integral therewith along the entire length of the adjacent edges of said stringer elements to be coupled, a slider member slidably engaging said stringer elements for coupling and uncoupling the same, means carried by said slider member for applying transverse compression to said stringer elements during the coupling operation, and anti-friction means for facilitating movement of the slider member longitudinally during coupling and uncoupling of said stringer elements, said means for applying transverse compression to the stringer elements including wall strips disposed on opposite sides of the outer edges of said stringer elements, said wall strips having outwardly directed flanges, and said slider member having inwardly directed shoulders for supporting said flanges and said wall strips for movement transversely of said stringer elements, and spring means for urging said wall strips toward said stringer elements.

References Cited in the file of this patent

UNITED STATES PATENTS

| | | |
|---|---|---|
| 1,703,712 | Aud | Feb. 26, 1929 |
| 2,306,488 | Morner | Dec. 29, 1942 |

FOREIGN PATENTS

| | | |
|---|---|---|
| 203,680 | Switzerland | June 16, 1939 |
| 709,898 | Great Britain | June 2, 1954 |

OTHER REFERENCES

Allerton: Abstract of application Serial No. 581,016, published August 16, 1949, 625 O.G. 837.